United States Patent [19]

Lidke et al.

[11] Patent Number: 5,499,305

[45] Date of Patent: Mar. 12, 1996

[54] METHOD AND APPARATUS FOR COALESCING A GRAYSCALE IMAGE AND RENDERING THE COALESCED GRAYSCALE IMAGE AS A BINARY IMAGE

[75] Inventors: Steven L. Lidke, Brooklyn Park; Reed R. Esau, Burnsville, both of Minn.

[73] Assignee: Lasermaster Corporation, Eden Prairie, Minn.

[21] Appl. No.: 220,280

[22] Filed: Mar. 30, 1994

[51] Int. Cl.⁶ .................................................. G06K 9/36
[52] U.S. Cl. ........................ 382/270; 382/293; 358/456
[58] Field of Search ......................... 382/50, 237, 270, 382/293, 308; 358/455, 456, 457, 458, 459, 465, 466; H04N 1/40

[56] References Cited

U.S. PATENT DOCUMENTS

| 4,766,499 | 8/1988 | Inuzuka | 358/283 |
|---|---|---|---|
| 4,823,189 | 4/1989 | Haines et al. | 358/75 |
| 5,111,310 | 5/1992 | Parker et al. | 358/456 |
| 5,201,013 | 4/1993 | Kumagai | 382/50 |
| 5,201,030 | 4/1993 | Carrie | 395/132 |
| 5,245,678 | 9/1993 | Eschbach et al. | 382/50 |
| 5,259,042 | 11/1993 | Matsuki et al. | 382/50 |
| 5,313,287 | 5/1994 | Barton | 358/458 |

FOREIGN PATENT DOCUMENTS

| 60-46665 | 3/1985 | Japan | 358/455 |

OTHER PUBLICATIONS

*Stochastic Screening Goes Beyond Postscript's Conventional Halftone Screening,* L. Mills Davis, Davis Inc., Quark Impressions, pp. 4–5 (no date).
*Product and Technology Overview,* Agfa CristalRaster Technology, Miles Inc., 1993, pp. 1–17.
*Frequency–Modulated Screening Technology,* Seybold Seminars '93, vol. 1, No. 2, May 19, 1993, pp. 8–9.
Gold, Ira, *The Promise of Stochastic Screening,* Color Publishing, Jul./Aug. 1993, pp. 7–8.
*Diamond Screening,* Linotype–Hell, 1993.
*Seybold Seminars '93: A Quick Overview from the High End,* The Seybold Report on Publishing Systems, No. 14, Jul./Aug. 1993, pp. 48–49.
*Digital Halftoning,* R. Ulichney, MIT Press, Cambridge, Mass., (1987), Chapters 8 and 9, pp. 233–344.

Primary Examiner—Leo H. Boudreau
Assistant Examiner—Andrew W. Johns
Attorney, Agent, or Firm—Kinney & Lange

[57] ABSTRACT

Pixels in a grayscale image are identified for coalescing based on a corresponding value in a threshold matrix. This threshold matrix value is then used to determine both the color and number of pixels to be coalesced at this location. Grayscale pixels are then coalesced based on pixels which will ultimately be the same color as the identified pixel. The coalesced grayscale image is then compared on a pixel-by-pixel basis to corresponding values in the threshold matrix to determine a halftone image.

14 Claims, 6 Drawing Sheets

５,４９９,３０５

METHOD AND APPARATUS FOR COALESCING A GRAYSCALE IMAGE AND RENDERING THE COALESCED GRAYSCALE IMAGE AS A BINARY IMAGE

BACKGROUND OF THE INVENTION

The present invention relates to a method and apparatus for rendering a halftone image from a grayscale image. More particularly, the present invention relates to a method and apparatus for coalescing grayscale intensity values within selected neighborhoods before transforming the grayscale image into a halftone image.

Continuous tone images or grayscale images which are made up of a series of regularly spaced tones ranging from white to black through intermediate shades of gray must often be rendered as a binary image or halftone image in a wide range of display devices such as printers, facsimile machines, lithography, liquid crystal displays and plasma panels to name a few. A display processor is frequently used to convert a grayscale image to a binary or halftone image. The halftone image is an arrangement of binary picture elements which provides the illusion of grayscale or continuous tone images. The algorithm or process performed by the display processor is frequently referred to as digital halftoning.

Some of these halftoning techniques are described in "Digital Halftoning" by R. Ulichney, MIT Press, Cambridge, Mass. (1987) incorporated herein by reference. These halftoning algorithms are often classified into point and neighborhood algorithms based on the number of points or pixels in the grayscale image that are utilized in determining each pixel in the binary or halftone image. The generic form of point algorithm a grayscale or continuous tone, discrete space image J[n] is compared with a threshold to determine an output halftone image I[n].

One such point algorithm is disclosed in U.S. Pat. No. 5,111,310 to Parker et al. entitled METHOD AND APPARATUS FOR HALFTONE RENDERING OF A GRAYSCALE IMAGE USING A BLUE NOISE MASK. The Parker patent discloses a method whereby the grayscale image is compared on a pixel-by-pixel basis against a blue noise mask to render a halftone image. Point algorithms are generally fast relative to neighborhooding algorithms. However, point algorithms tend to suffer from artifact problems such as periodic artifacts and false contours.

In contrast, to point algorithms neighborhood algorithms require more than one point from the grayscale image to determine each pixel of the halftone image. A popular neighborhood algorithm is an error diffusion algorithm. General form of the error diffusion algorithm the output binary image I[n] having values of 0 or 1 are compared with the original grayscale or continuous tone image J[n]. The difference between this input and output value is referred to as the "error" for location n. An error signal representing past errors is passed through an error filter, E[n], to produce a correction factor which is added to future input values.

One form of error diffusion is disclosed in U.S. Pat. No. 5,201,013 to Kumagi entitled DITHER PROCESSING METHOD. Error diffusion methods in general have several shortcomings. One shortcoming is the presence of correlated artifacts in many of the gray level patterns. A second shortcoming is directional hysteresis due to the raster order of processing which is most apparent in very light and dark patterns. Additionally, error diffusion algorithms tend to have transient behavior near edges or boundaries. These problems are discussed in more detail and illustrated in "Digital Halftoning" by R Ulichney.

There is an ever present need for halftoning techniques that minimize artifacts and undesired patterns in the binary or halftone output. In addition, these techniques should be capable of executing relatively fast and have relatively modest processor and memory requirements for the image preprocessor. In general, the greater the processor and memory requirements, the greater the cost of the preprocessor.

In addition, a halftoning technique should be capable of compensating for the darkening of the output image due to broadening and overlap of adjacent black pixels which darkens the image, frequently referred to as "dot gain". Because of this dot overlap phenomenon there is little change in reflectance or perceivable tone changes as more pixels are added to high density regions. Therefore, the halftoning technique should be able to compensate for this nonlinearity in tone where pixel density is large.

A related problem occurs as a result of nonlinearity in the reflectance or tone changes for very light tone which must be compensated for in the halftoning algorithm. This nonlinearity occurs because the first level of tint or lightest tone produces the appearance of being much greater than each of the subsequent levels of increasing tone, for example, algorithms that make use of a 16 by 16 halftone grid for displaying 256 levels of gray values. An increasing number of pixels are selectively turned on within the grid to achieve increasing levels of gray. However, the minimum tint level with just one pixel of the 64 pixels turned on is a very noticeable level of tint. Moreover, this first level of tint appears to be greater than each subsequent level of increasing tint. Therefore, the halftoning technique should be capable of compensating for this minimum tint level so that the first tint level is not as extreme.

The halftoning technique should also provide a halftone output image that when transferred to printing plate provides good lithographic properties. Plate making for offset printing requires large and well formed pixels in the output image. Therefore, the halftoning algorithm should form pixels that are well suited to the plate making process.

Finally, output devices such as printers tend to have problems that effect the output image that is the result of the printer mechanism and not the form of halftoning algorithm. An example is gear noise, which is the result of nonuniform line spacing between adjacent rows or columns in the output binary image. This nonuniform line spacing is the result of imperfections in the mechanism used to move the paper past a scanner or print head which puts toner on the paper. Gear noise is a greater problem as the resolution of the printing device becomes higher or better. For example, a 1200 dot per inch print engine places rows or columns of pixels 10 at a separation of $\frac{1}{1200}$ of an inch as compared to a 300 dot per inch print engine which places rows and columns of pixels at a separation of $\frac{1}{300}$ of an inch. For the same error in movement of paper through each of these print engines the percentage of error relative to line spacing is much greater for the higher resolution 1200 dot per inch print engine. Previously used high resolution printers have made use of much more costly mechanisms for moving paper past the print engine. However, this adds significantly to the cost of the printing or output device. Therefore, there is a present need for printing devices which exhibit minimal gear noise that utilize relatively low cost paper transfer mechanisms.

SUMMARY OF THE INVENTION

The present invention is a method and apparatus for forming a halftone image from a grayscale image. The resultant halftone image tends to minimize gear noise effects as well as minimize other unwanted visual effects such as dot gain, nonlinearities in reflectance, artifacts and false contours. The method includes identifying intensity threshold values from a lookup table for each of a plurality of selected pixel positions in the grayscale image. The method includes coalescing pixels neighboring each selected pixel position based on the intensity threshold value associated with the selected pixel position and intensity information of neighboring pixels to form coalesced grayscale image information.

Another aspect of the present invention is a method for constructing a lookup table of threshold values for use in forming a halftone image from a grayscale image. The method includes assigning an intensity value corresponding to an intensity value within the grayscale image to a plurality of table elements. Also included is the step of assigning the lookup table elements to a location within the lookup table with each lookup table element maximally separated from the other lookup table element locations having similar intensity values. Also included is the step of incrementing the intensity value and repeating the previous method steps so that a lookup table of intensity values is formed having approximately equal numbers of each intensity value within the grayscale image that are distributed pseudorandomly.

DETAILED DESCRIPTION OF THE PREFERRED EMBODIMENTS

The present invention is a method and apparatus for rendering a halftone image from a grayscale image. Grayscale images which are made up of a series of regularly spaced tones ranging from white to black through intermediate shades of gray. Although the grayscale image is discussed in terms of tones ranging from white to black, a grayscale image can represent other colors as well, such as red, green and blue which are used in standard three-color display processes or cyan, magenta, yellow and black which are used in standard four-color printing processes. The halftone image created by the method and apparatus of the present invention is a binary image which is composed of pixels or dots which are made up of two colors but when arranged properly allow the halftone image to appear as having a whole range of tints between these two colors.

Figure 1:
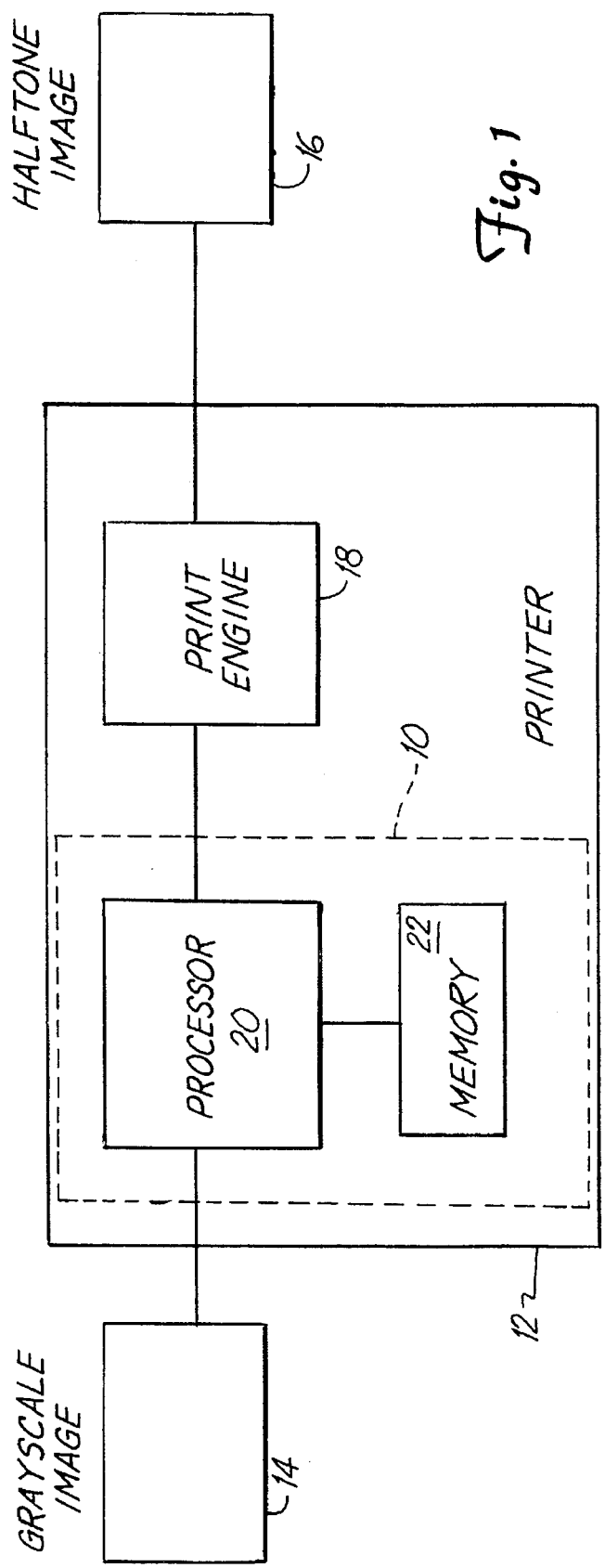
FIG. 1 shows an output apparatus for use with the method of the present invention for converting a grayscale image to a halftone image.

FIG. 1 represents an apparatus 10 of the present invention which is incorporated into a printer 12. The apparatus 10 of the present invention receives the signal representative of the grayscale image 14 and transforms this grayscale image into a signal representative of the halftone image which when provided to a print engine 18 the output halftone image 16 is produced.

It is the apparatus 10 and method performed by the apparatus 10 that is the subject of this invention. Although the apparatus 10 is shown providing a halftone image signal to a print engine 18, this halftone image signal could also be provided to a wide range of display devices such as facsimile machines, lithography, liquid crystal displays and plasma panels or any other conventional halftone display device. The apparatus of the present invention 10 includes a processor 20 and a memory or storage device 22 which is linked to the processor for transferring information therebetween. The processor 20 can be any one of a number of digital processing devices such as a microprocessor, specialized image processing device or hardware configured to implement the method of the present invention. The memory 22 represents a storage device such as semiconductor memory, optical memory, magnetic storage devices such as a disc drive or any other conventional digital storage device.

Figure 2:
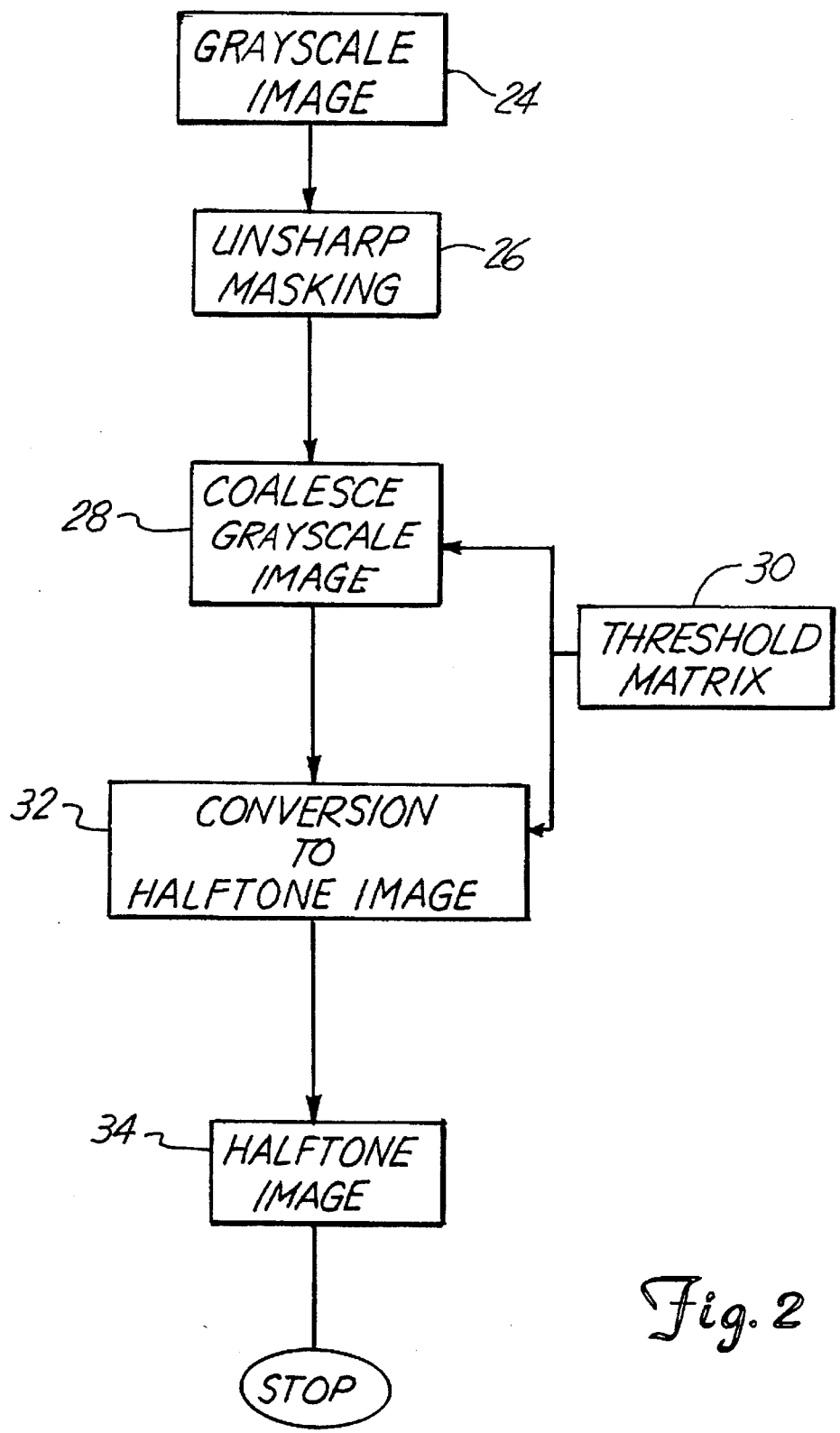
FIG. 2 is a representation of the method of the present invention for converting a grayscale image into a halftone image.

One aspect of the present invention is a method and apparatus for rendering a halftone image from a grayscale image as represented by the diagram shown in FIG. 2. The method and apparatus of the present invention uses a pseudorandom pattern in the formation of halftone pixels in order to minimize artifacts and undesired patterns in the halftone image. An important aspect of the method and apparatus of the present invention is the step of coalescing pixels for these newly formed super pixels tend to bridge the gap between lines in the output image thereby tending to mask gear noise. In addition, the step of coalescing pixels within the grayscale image helps to compensate for the darkening of the output halftone image due to the broadening of black pixels. In addition, this step of coalescing pixels helps to compensate for the nonlinearity in reflectance at light levels of tint. This coalescing step further helps define larger or grouped pixels in the output image which are well suited for the print making process. Each of these benefits of the method and apparatus of the present invention will be discussed in more detail later.

The grayscale image 24 is represented by a series of achromatic tones having varying proportions of white and black to give a full range of grays in between white and black. In one embodiment, the grayscale image in an 8-bit grayscale image that has 256 separate levels between and including white and black. Although the grayscale image is described with respect to a black and white image, the grayscale image may represent a colored image as well.

An unsharp masking process represented by step 26 is performed on the grayscale image 24 to sharpen the grayscale image to compensate for blurring of the image which occurs later in the process. The use of unsharp masking allows the output halftone image to have approximately the same degree of sharpness as the input grayscale image 24. Unsharp masking 26, or as sometimes referred to as unsharp filtering, is well known and used in a variety of image processing applications.

One aspect of the method of the present invention is the process of coalescing the grayscale image 28. This method utilizes a threshold matrix 30 to determine which pixels within the grayscale image to coalesce selected neighboring pixels. In addition, the process utilizes the threshold matrix 30 to determine how many pixels to coalesce once a neighborhood for coalescing has been identified. The proper number of pixels are then coalesced within the designating coalescing neighborhood provided the pixel threshold requirement by the neighboring pixels are met. The process of coalescing pixels in the grayscale image represented by step 28 will be discussed in more detail later. However, it is the process of coalescing pixels and the different thresholds that are used for controlling how much color or pixel intensity to coalesce which provides many beneficial characteristics of the ultimate halftone output as will be discussed in more detail later.

Another aspect of the present invention is the method used to create the threshold matrix 30. The threshold matrix 30 when created using the process of the present invention provides some unique characteristics to both the coalescing process of step 28 and the conversion process of step 32 which will be discussed next.

The conversion of the coalesced grayscale image step 28 to a binary or halftone image is represented by step 32. This conversion process is accomplished by comparing the coalesced grayscale image on a pixel-by-pixel basis with corresponding pixels in the threshold matrix 30 for either forming a pixel or not forming a pixel in the output halftone image represented by step 34. This conversion process represented by item 32 will be discussed in more detail later.

Figure 3:
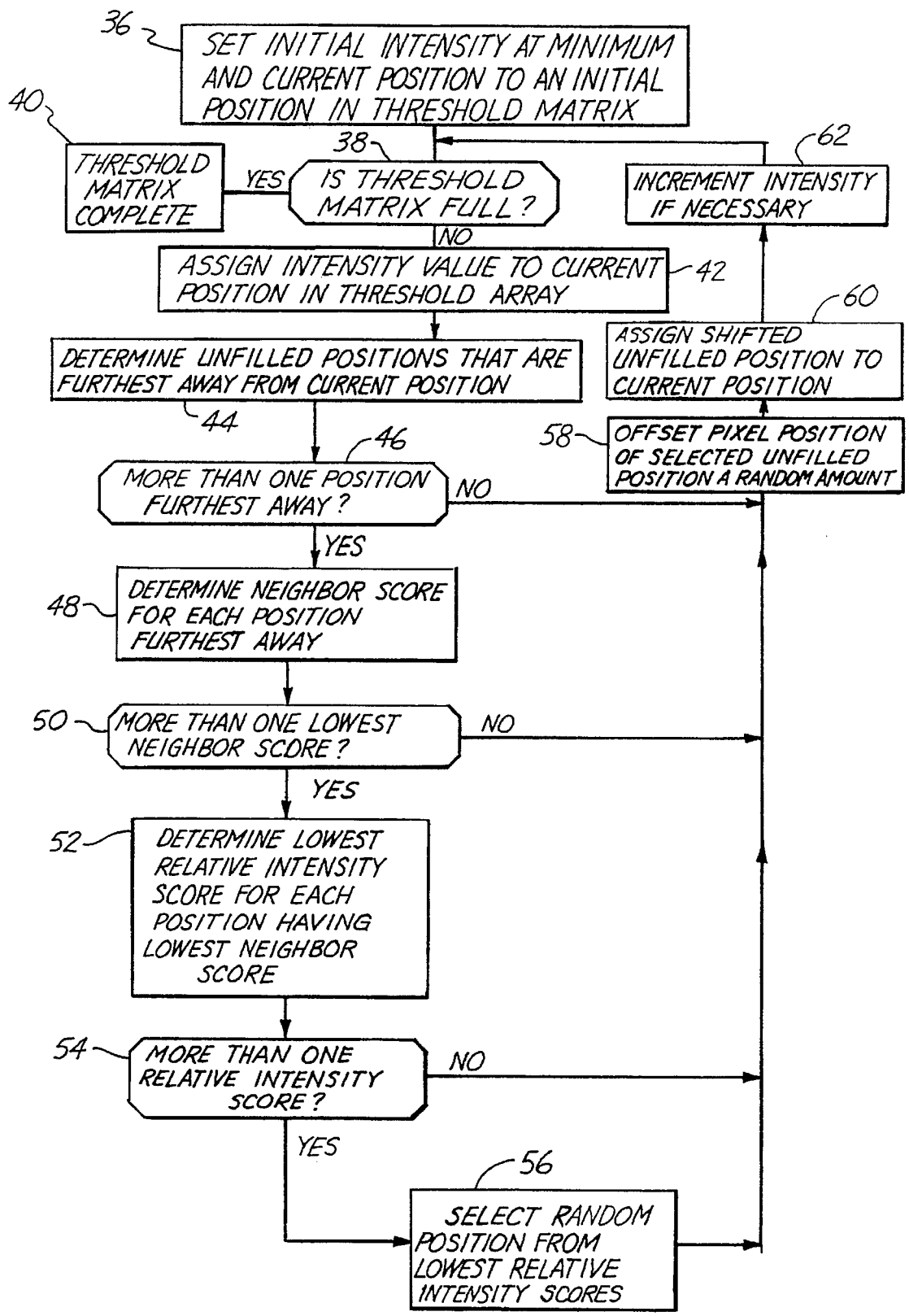
FIG. 3 is a representation of the method of the present invention for forming a threshold matrix.

FIG. 3 is a representation of the method steps for forming the threshold matrix 30 of FIG. 2. The threshold matrix 30 is a two dimensional array of values or lookup table. These values in the lookup table represent the entire range of tonal values or intensity values in the grayscale image. This threshold matrix 30, when formed using the method of the present invention, has an equal number of each threshold matrix intensity values and these values are maximally distributed within the threshold array. In addition, the threshold array is formed to have wraparound properties in each of the array dimensions.

The formation of the threshold matrix can be thought of as a process of placing pixels having intensities associated with each corresponding value placed in the array. The method of the present invention for forming the threshold matrix begins with the step of setting the initial intensity at a minimum value and the current position pointer to an initial position in the threshold matrix represented by step 36. As discussed previously, each pixel in a grayscale image has a range of intensity values from white to black. For an 8-bit grayscale image this represents intensity values from 0 to 225 with 0 representing white and 255 representing black. The initial intensity represents the first intensity value that will be placed in the threshold matrix. The threshold matrix is formed by placing the lowest values for the values having the least tint or whitest first.

A pseudorandom number generator is used to generate a location within the threshold matrix for placing the first intensity value. Each succeeding intensity value will be placed in a location determined by a location algorithm as will be discussed. An equal number of each intensity value between 0 and 255 are placed in the threshold array until the array is full. An important part of this method is to ensure each of these intensity values are well distributed without any noticeable repeating pattern throughout the threshold array. As will be discussed, the method of the present invention ensures that identical intensity values will be maximally spaced. In addition, intensity values will be placed to ensure uniform color distribution or a relatively smooth color contour.

For example, a threshold array that has a size of 128 by 128 will have a total of 16,384 values. Dividing the number of values in the threshold array by the 256 intensity levels in the grayscale image yields a result of 64. Therefore, there will be 64 intensity values placed in the threshold array for each of the 256 intensity levels in the grayscale image. According to the method of the present invention the lowest or 1 intensity values of which, for this example there are 64, are placed in the threshold array one at a time so that these values are evenly distributed. The next 64 values for intensity level 2 are then placed in the array utilizing a similar method. This process is repeated until level 255 is placed in the threshold array. The result is a lookup table of pixel values or threshold intensity levels that are pseudorandomly distributed throughout the lookup table array.

A test to determine if every pixel location or value in the threshold matrix is full is represented by step 38. If each location in the threshold matrix is full, then the threshold matrix is complete as represented by step 40. However, if all locations in the threshold matrix are not full, then an intensity value must be assigned to a location selected by the method of the present invention as represented by step 42.

As discussed previously, the first intensity value is placed in the threshold matrix at a pseudorandom location. However, the location of each successive intensity value is determined using the method that will now be described. The first step for determining the next threshold array location to fill is to determine, at step 44, candidate untilled locations that are furthest away from the location filled in step 42. This distance to the furthest untilled candidate location is complicated slightly by the fact that the threshold matrix is treated as having wraparound properties. Therefore, the threshold matrix can be thought of as having identical threshold matrixes positioned adjacent thereto with the matrix wrapping around in the vertical and horizontal direction to form one continuous surface for the purposes of both filling the threshold matrix and later when comparing pixels in the grayscale image with pixels in the threshold array.

The determination of points furthest away from the current position in the threshold array must take into consideration the wraparound features of the array. In one preferred embodiment, the threshold array is treated as if a cartesian coordinate system was placed having an origin at the current position in the threshold array and distances to untilled candidate locations are selected from intensity values within the threshold matrix are selected from intensity values within the threshold matrix are less than a selected distance from the current location. In this preferred embodiment, the selected distance is half the distance of the threshold array. Taking into consideration the fact that the threshold matrix has wraparound properties ensures an even distribution of points along the periphery of the threshold matrix thereby ensuring the threshold matrix is seamless if the matrix is tiled or positioned adjacent itself.

In step 46 if there is only one position that is furthest away, then a candidate location is selected in step 46. However, if there are more than one candidate locations furthest away from the current position, then additional method steps are required to select from one of these unfilled candidate locations.

A first method for selecting from more than one unfilled candidate location in the threshold matrix is to determine a neighbor score for each of these candidate locations represented by step 48. The neighbor score represents the degree of similarity of the neighboring intensity values by neighboring to the intensity being placed weighted by the separation of the neighboring intensity values. This weighting by separation weighs the intensity values that are closer weighted more heavily. Therefore, this neighbor score attempts to assign high values to pixel candidate locations that have similar intensity values that are located relatively close to the candidate location. Lower neighbor scores are assigned to those candidate locations having fewer intensity values that are similar to the intensity value to be placed. In addition, lower neighbor scores are assigned if these intensity values are spaced further from the candidate location.

In one preferred embodiment, the neighbor's score is computed by determining the pixel intensities of a predefined neighborhood surrounding the candidate location and multiplying each of these intensity values by a weighting factor which weights pixel intensities greater the closer they are to the candidate location. The neighbor's score is then the sum of each of the pixel intensities within the predefined neighborhood multiplied by a weighting factor indicative of the pixel separation from the candidate location.

Once the neighbor's score for each candidate location furthest away from the current position is determined, the lowest neighbor's score of these candidate locations is selected in step 50. However, if there are more than one candidate locations that have the same neighbor's score, then an additional test is required to determined which one of these candidate locations having the lowest neighbor's scores should be selected.

To select from more than one candidate pixel location having the lowest neighbor's score a relative intensity score is determined for each of these candidate locations represented by step 52. A relative intensity score takes into consideration intensity and separation of neighboring pixels to the candidate location. More specifically, the relative intensity score is a numeric value which is the sum of the intensity values within a predefined distance of the candidate location weighted by the separation of each of these intensity values with larger separation distances being weighted less than smaller distance separations. Therefore, these relative intensity scores effectively represent an intensity contour for the threshold matrix. By selecting the candidate location having the lowest relative intensity score helps ensure pixels having similar intensity values are evenly distributed.

In step 54 the candidate position having the lowest relative intensity score for each position having the lowest neighbor score is selected. If more than one position has a lowest relative intensity score, then one of the candidate positions are selected from those having lowest relative intensity scores at random as shown in step 56. In one preferred embodiment, this random selection is done by a pseudorandom number function generator which selects one of these candidate positions.

Once a candidate unfilled position is selected from either of steps 46, 50, 54, or 56 this selected untilled position is then offset by a random amount within a range of value as represented by step 58. Offsetting the selected location, a random amount helps ensure positions are filled randomly rather than in a discernible pattern. In one preferred embodiment, the range of offset distances is 10 pixel locations from the selected pixel location initially. This range of offset distances is reduced as the threshold matrix is filled. This selected unfilled position is then assigned the current position as represented by step 60.

The intensity value is then incremented if necessary as represented by step 62. Because there are an equal number of each intensity values within the threshold matrix, one can easily compute a number of each intensity value which should be placed in the threshold matrix. Only after each of the pixels having the same intensity value have been placed in the matrix will the intensity value be incremented so that the next higher intensity values can be placed in the threshold matrix.

The method continues as long as the threshold matrix test in step 38 is not affirmative, the intensity of step 62 will then be placed in the current position in step 42. Once the threshold matrix is full as indicated in step 40 the process is complete and the threshold matrix is output for use in the system. Note that the current position after the first iteration through the process is updated in step 60.

Another aspect of the present invention is the method for coalescing pixels in the grayscale image as represented by step 28 in FIG. 2. The process of coalescing pixels in the grayscale image is an important aspect of the present invention. This process of coalescing pixels rearranges pixel intensities in the grayscale image so that the halftone image that is formed in the conversion of the grayscale image to a halftone image represented by step 32 in FIG. 2 has desirable properties as will be discussed later. These properties are the result of a variety of selections that are made within this process such as the selection of pixel locations within the grayscale image for coalescing, the selection of pixel within the neighborhood for relocation adjacent the pixel location for coalescing, and the destination or location for the selected pixels within the neighborhood. Each of these decisions and the effects these decisions have on the output halftone image will be discussed later.

Figure 4:
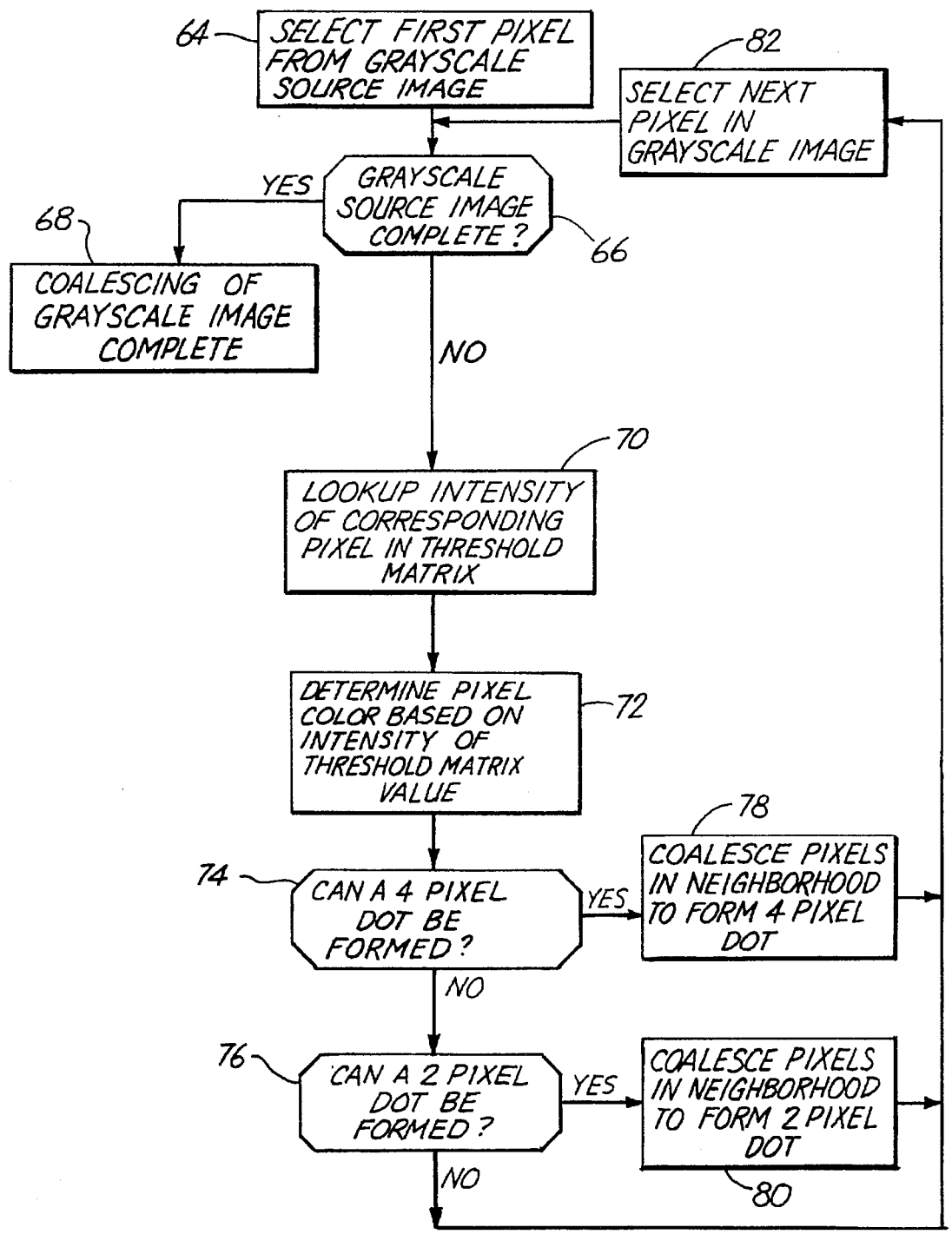
FIG. 4 is a representation of the method of the present invention for coalescing the grayscale image.

FIG. 4 which represents detail of the coalescing process represented by step 28 in FIG. 2. The process begins by selecting a first pixel from the grayscale or source image as represented by step 64. In step 66 a check is made to determine if the grayscale source image is complete. If there are no more pixels left in the grayscale source image, then the coalescing process is complete as indicated by step 68. However, if there are more grayscale pixels left in the grayscale image, then the method continues repeating steps 70, 72, 74 and 78 if a four-pixel dot is formed, 76 and 80 if a two-pixel dot is to be formed and 82.

As represented by step 70 a value is selected from the threshold matrix which corresponds to the selected pixel in the grayscale image. As discussed previously, the threshold matrix was formed to have wraparound characteristics. The coordinates of the pixel or value in the threshold array are selected using modulo arithmetic. For example, the X coordinates in the threshold array are equal to the X coordinate of the selected pixel in the grayscale image divided by the coordinate of pixels in X dimension of the threshold array with the remainder being the X coordinate in the threshold array. A similar computation is done for the Y coordinate in the threshold array so that a threshold array value which corresponds to the selected grayscale pixel location can be selected.

Based on the intensity value of the pixel selected from the threshold matrix in step 70 the pixel color of this selected grayscale pixel is determined as represented by step 72. The pixel color represents a color assigned to a pixel in the halftone image which corresponds to the selected grayscale pixel. The conversion of the grayscale image to the halftone image is performed in step 32 of FIG. 2 and will be discussed in more detail later. In this conversion each grayscale pixel is converted to one of two pixel colors. The pixel color in step 72 refers to one of these pixel colors in the halftone image. For example, a black and white grayscale image will have a halftone image made up of white pixels and black pixels. The color assigned to the corresponding halftone pixel, performed in step 32 of FIG. 2, is based on a comparison of the grayscale pixel intensity with the corresponding value in the threshold array as will be discussed in more detail later.

The pixel color determines the color of pixel that will be coalesced to form a group of pixels of this same color in the event pixels are coalesced at this location. The decision to coalesce pixels is made in decision steps 74 and 76 as will be discussed shortly. If the intensity value of the selected grayscale pixel is less than the corresponding value in the threshold matrix, then more than one black pixel may be coalesced at this location. If the selected grayscale pixel value is greater than the corresponding threshold matrix value, then more than one white pixel may be coalesced at this location.

In step 74 a decision is then made as to whether four pixels should be coalesced at this location. If this criteria is met, then pixels are coalesced in step 78 to form a four-pixel dot, if possible. If a four-pixel dot cannot be formed in step 74, then a test is made to determine if a two-pixel dot can be formed. If a two-pixel dot can be formed, then in step 80 neighboring pixels are coalesced to form a two-pixel dot, if possible. If neither a four-dot nor a two-pixel dot can be formed in steps 47 and 76, then no coalescing is performed at the selected grayscale pixel location. If either a four-pixel dot is attempted, a two-pixel dot is attempted or no coalescing should be performed at this grayscale pixel location, then step 82 is performed which represents the selection of the next pixel in the grayscale image.

The criteria for determining if either a two-pixel or four-pixel dot should be formed will now be explained. The decision to form either a two-pixel or a four-pixel dot is based on the corresponding value in the threshold matrix array. A preselected range of values are stored for each of a white two-pixel dot, a white four-pixel dot, a black two-pixel, and a black four-pixel dot. If the corresponding threshold matrix value falls within these range of values, then the corresponding dot formation will be attempted in step 78 and 80.

Figure 5:
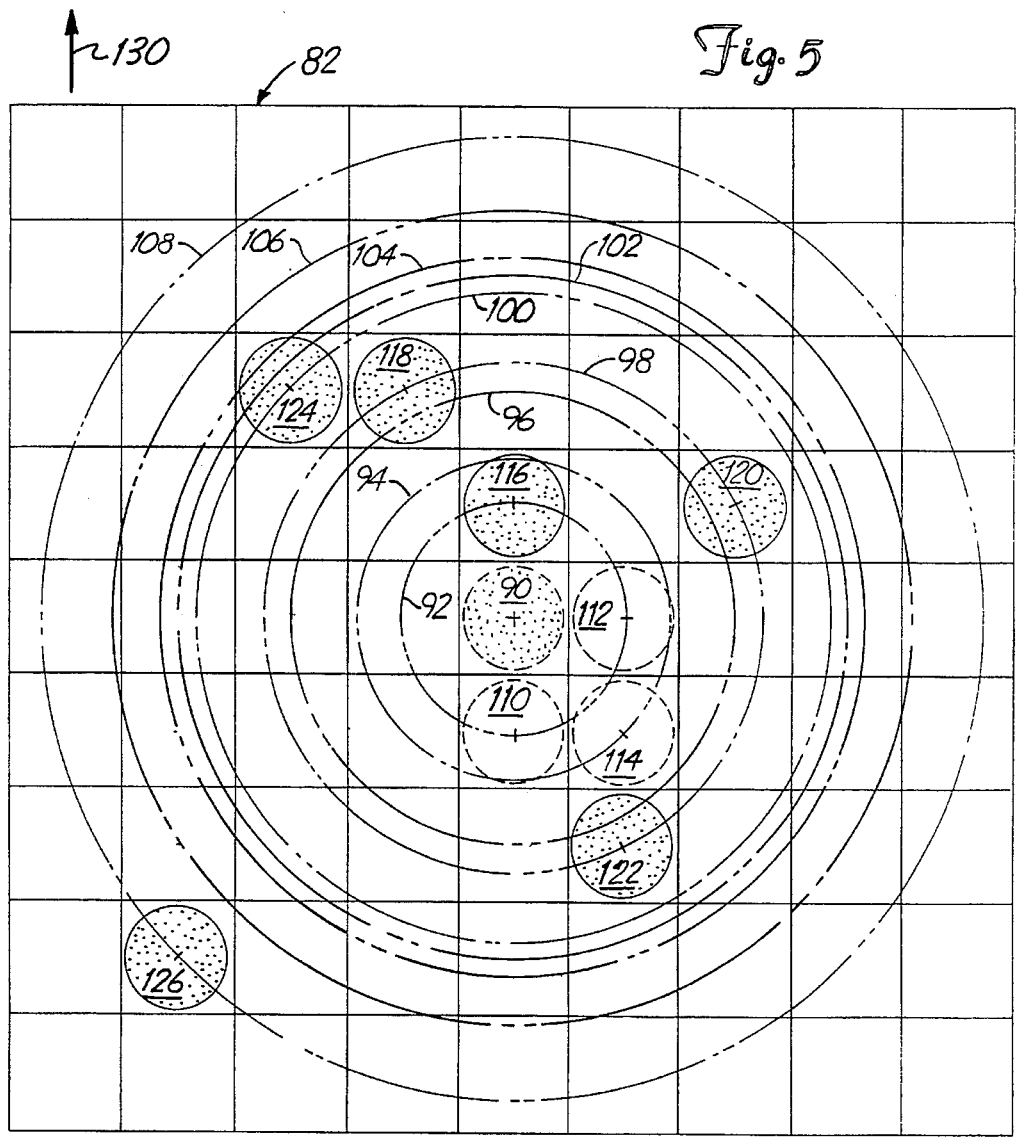
FIG. 5 is a diagram illustrating the process of coalescing pixels in a selected neighborhood.

The steps of forming each of the four-pixel or two-pixel dots of steps 78 and 80 can best be explained with reference to FIG. 5. FIG. 5 shows a grid 82 defining a plurality of pixel locations within the grayscale image. A grayscale pixel selected in either of step 64 or 82 in FIG. 4 is represented by pixel 90. A series of concentric circles 92, 94, 96, 98, 100, 102, 104, 106, and 108 pass through the center of neighboring points and represent neighboring points or point of equidistance from the selected grayscale pixel 90. If a two-pixel dot is to be formed, the method of the present invention will attempt to fill pixel location 110 with the nearest neighboring pixel that will have a corresponding pixel in the halftone image that is the same color as the selected grayscale pixel 90, if this nearest pixel's intensity value is placed in location 110. Put another way, pixel location 110 is filled with an intensity value from neighboring pixels that is less than the corresponding threshold matrix value if pixel 90 is black, or greater than the corresponding threshold matrix value if pixel 90 is white. The neighboring pixel selected to fill location 110 is then assigned an intensity value that will ultimately be a color other than the color of pixel 90. Because the ultimate color of the halftone pixel is based on a comparison of the threshold value associated with the corresponding grayscale pixel it is not enough to simply swap grayscale intensity values between pixel location 110 and the selected neighboring pixel to fill this location. The grayscale intensity values at the selected neighboring pixel must be adjusted to ensure this pixel is converted to a correct ultimate color or correct halftone color that is different from the color of pixel 90. If a four-pixel dot from step 78 of FIG. 4 should be formed, then pixel location 110 in addition to pixel locations 112 and 114 will be filled or at least attempted to be filled in a manner similar to the formation of a two-pixel dot.

As discussed previously, the color of the two-pixel or four-pixel dot is determined by comparing the intensity value of the selected grayscale pixel 90 with the corresponding pixel in the threshold array. For example, assuming the corresponding threshold matrix value is 200 which is a relatively high value. If the pixel intensity of the selected grayscale pixel is less than 200, then the method attempts to coalesce a black pixel at this location provided the coalescing thresholds are met. The coalescing thresholds are a predetermined range of values which the corresponding threshold matrix value must fall within for either a four-pixel dot or two-pixel dot to be formed. For example, if the range of grayscale values for which a four-pixel black dot should be formed is 133 to 144 and the corresponding threshold matrix value falls within this range, then a four-pixel black dot will be attempted.

The process of coalescing or forming a four-pixel black dot will now be described. In general grayscale pixels that will be coalesced are those closest to the selected grayscale pixel 90. In addition, pixels that will be coalesced are those that will ultimately be the same color as the selected grayscale pixel 90. To determine the ultimate color of a pixel neighboring the selected pixel 90 the pixel intensity of the neighboring pixel must be compared with the threshold matrix value of the location to be filled during coalescing. A pixel having an intensity value less than its threshold matrix value of the fill location will ultimately be black and a pixel having an intensity value that is greater than its threshold matrix value will ultimately be white.

For the example shown in FIG. 5, since the selected grayscale pixel 90 is black, the neighborhood surrounding this pixel will be searched for pixels that will ultimately be black when placed in fill location 110. The search begins by examining pixels that are centered or located nearest the selected grayscale pixel 90 as represented by circle 92. Grayscale pixels 116, 118, 120, 122, 124, and 126 neighboring the selected pixel 90 are the only pixels within the neighborhood defined by circle 108 that have intensity values that are less than the corresponding threshold matrix value or fill location 110 or are pixels that will ultimately be black.

Starting at a random location each point equidistant away from the selected grayscale pixel 90 are evaluated. Grayscale pixel 116, if first selected and if ultimately will be a black pixel, will have its intensity value swapped with pixel location 110 thereby forming a two-pixel dot. In this swapping process the intensity values of the grayscale pixel value originally in location 110 may need to be adjusted when swapped to location 116 to ensure the pixel color will be different from the color of pixel 90.

In this manner, color is moved or coalesced within the grayscale image without significantly affecting or distorting the ultimate halftone rendering of the grayscale image.

The formation of a four-pixel dot requires searching the remaining pixels closest to the selected grayscale pixel 90 to fill locations 112 and 114. If none are found that will be black if their intensity value is swapped with one of these pixels, then the search extends to pixels that are further out represented by concentric circle 94. If grayscale pixels 118, 120, 122, 124, and 126 represent the only remaining grayscale pixels within a neighborhood defined by circle 108 that will become black if swapped with pixel locations 112 and 114, then two of the pixels on circle 98 will be selected to fill positions 112 and 114 in order to form a four-pixel dot. Which one of these three pixels that is selected will depend on what pseudorandom position on this ring is selected to begin the search.

Because a neighborhood of pixels are required in this coalescing step it is necessary that a buffer be maintained containing the neighboring pixels. For the example shown in FIG. 5, seven lines of the grayscale image are buffered so that a neighborhood of the size shown in FIG. 5 can be used.

A similar coalescing operation is performed for a selected grayscale pixel that is ultimately white. In this case, the neighboring grayscale pixels will be evaluated for those pixels that have grayscale values that are greater than their corresponding threshold matrix value. For these pixels, are pixels that will ultimately be white and thus can be coalesced to form either a two-pixel or four-pixel white dot.

Note that although only five pixels are shown within the neighborhood defined in FIG. 5, these five pixels represent only those pixels that will ultimately be the same color as the selected grayscale pixel 90. For this illustration, the remaining pixels that are not shown can be assumed to have a color other than the color of the selected grayscale pixel 90.

In each of the steps 70 and 80 where four-pixel and two-pixel dots, respectively, are formed the actual completion of a four-pixel or two-pixel dot is dependent on the neighboring pixels. Therefore, it is not always possible to form a four-pixel dot in step 78 or form a two-pixel dot in step 80. Once pixels are coalesced then the next pixel in the grayscale image is selected in step 82. If this next pixel in the grayscale image is not the last pixel, the process will continue until the last pixel is completed. Whereupon the grayscale image is complete as shown in step 68.

Figure 6:
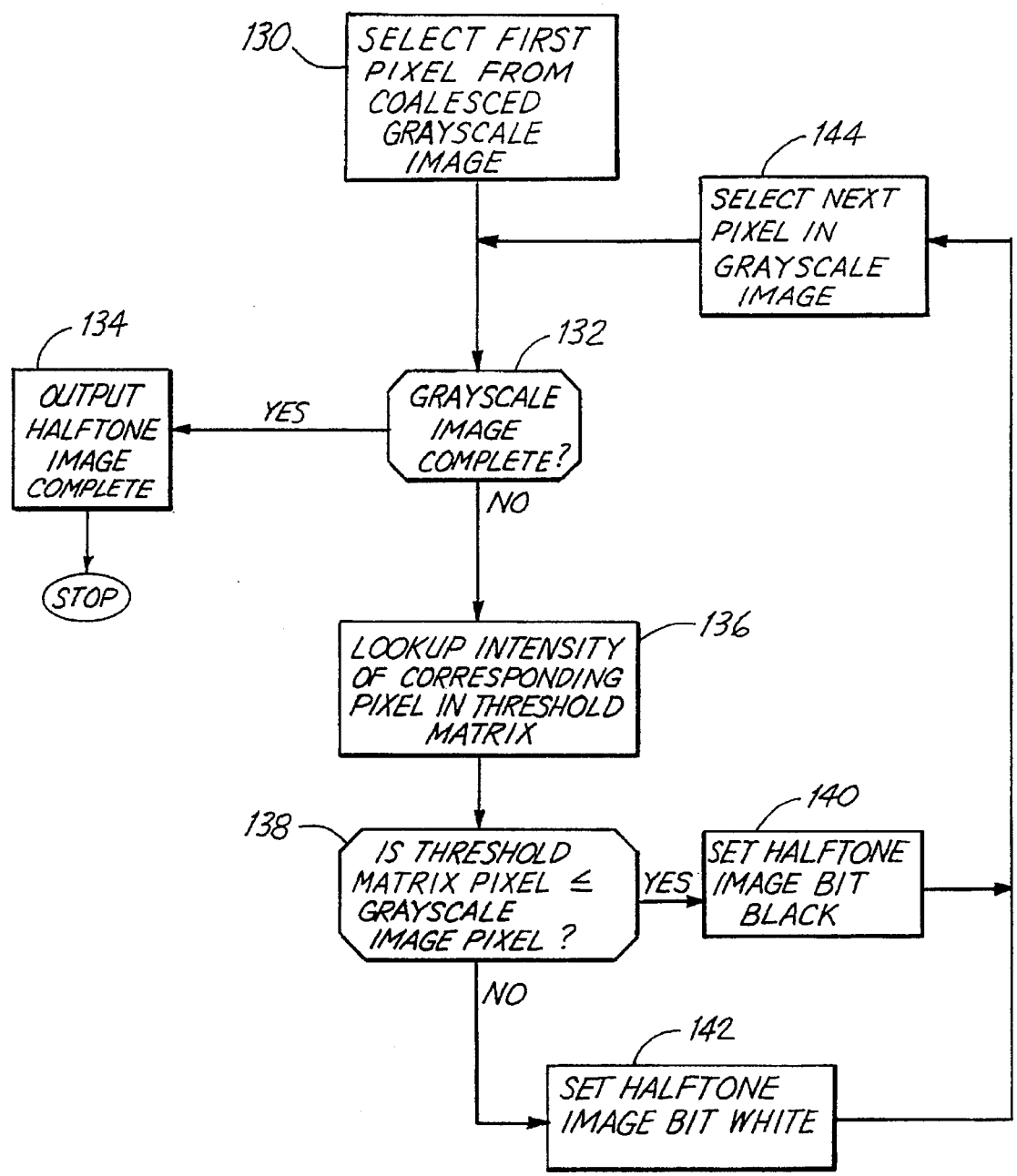
FIG. 6 is a representation of the method for converting the coalesced grayscale image into a output halftone image.

Refer now to FIG. 2, after coalescing the grayscale image of step 28 which was previously discussed, the coalesced grayscale image is then converted to a halftone image as represented by step 32. This process of converting the coalesced grayscale image to a halftone image will now be discussed in detail with reference to FIG. 6. The method begins by selecting a first pixel from the coalesced grayscale image represented by step 130. A check is then made to see if the grayscale image is complete as represented by step 132. If there are no remaining pixels in the coalesced grayscale image, then the image is complete as represented by step 134.

If the coalesced grayscale image is not complete, then step 136 is performed which involves determining an intensity value for a corresponding pixel in the threshold matrix. This value in the threshold matrix is determined in a similar manner to step 70 of FIG. 4 which refers to the general process of coalescing the grayscale image. Because the threshold matrix has wraparound properties modulo arithmetic is used to determine a threshold matrix value which corresponds to the selected pixel within the coalesced grayscale image.

The intensity value of the selected coalesced grayscale pixel is compared to the corresponding threshold matrix value in step 138. If the threshold matrix value is less than the selected grayscale intensity value then in step 140, a corresponding halftone image bit or pixel is set black. Conversely, if the threshold matrix value is greater than the selected coalesced grayscale pixel value, then the halftone image bit is set white as represented by step 142.

The next pixel in the coalesced grayscale image is then selected as represented by step 144. The process is then performed for each pixel in the grayscale image until the grayscale is complete. The resulting halftone image then is a rendering of a grayscale image using just black and white image bits or pixels.

An alternative embodiment of the present invention makes use of a nonuniform distribution of pixel intensity values within the threshold array. One such nonuniform distribution can have greater numbers of pixels having relatively high pixel intensity values than pixels having relatively low pixel intensity values. This weighting of the threshold array toward high intensity values results in fewer grayscale image pixels that will be greater than the threshold matrix pixel and therefore fewer halftone image bits that are set black in step 140 of FIG. 6. Because there are fewer black pixels in the output halftone image the overall tint will be lighter in this image. Conversely, the threshold matrix can be weighted toward low intensity values to provide fewer white halftone image bits in the output halftone image thereby increasing the overall tint.

An important aspect of the method and apparatus of the present invention is the formation of two dot pixels and four dot pixels having proper orientation relative to the direction of movement of the paper through the printer tends to mask or wash out gear noise effects. Referring to FIG. 5, if the direction of paper movement past the print head is shown by arrow 130 when the halftone image is primed, then gear noise and paper slippage can result in uneven spacing between rows of pixels. However, the process of coalescing pixels such as the placement of a black pixel at location 110 adjacent the black pixel in location 90 tends to form a single dot because the printing process tends to result in dot gain or the overlap between black dots at locations 90 and 110. This overlap tends to bridge the gap between any uneven line spacing between these pixels. This bridging the gap between pixels at each location where pixels are coalesced tends to mask the uneven line spacing.

Another important aspect of the method and apparatus of the present invention is the output halftone image includes clusters of pixels or super pixels which provide large and well defined halftone color areas which are well suited to the plate making process. In addition, these clusters of pixels or super pixels are formed in a well distributed, pseudorandom manner thereby minimizing unwanted patterns or artifacts in the output halftone image. Furthermore, the number of pixels that are coalesced or the size of these super pixels is defined by a preselected range of grayscale pixel intensity values thereby controlling at what grayscale tint values each of the two-pixel and four-pixel dots will begin to be formed. In this manner, the coalescing of pixels is well controlled to occur in those tint levels which nonlinearity in reflectance occurs. The formation of white four-pixel dots and white two-pixel dots in these heavy tint areas helps to compensate for the dot gain problem by preventing dot overlap in selected areas thereby providing a change in reflectance or perceivable tone change in this nonlinear tone region.

The formation of two-pixel and four-pixel black dots in the coalescing step at specific levels of tint tends to compensate for the nonlinearity of tint in these light tint regions. The clustering of black dots in the light tint region tends to provide the appearance of a very light tint instead of a washed out level of gray if these black dots are not coalesced.

Although the present invention has been described with reference to preferred embodiments, workers skilled in the art will recognize that changes may be made in form and detail without departing from the spirit and scope of the invention.

What is claimed is:

1. A method of forming a halftone image from a grayscale image, the method including:

identifying intensity threshold values from a lookup table for each of a plurality of selected pixel positions in the grayscale image; and coalescing similar grayscale pixels in the grayscale image neighboring each selected pixel position based on the intensity threshold value associated with the selected pixel position and intensity information of neighboring pixels to form coalesced grayscale image information.

2. The method of claim 1 wherein the lookup table includes intensity threshold values distributed in a pseudo-random pattern associated with pixel locations on a grayscale image.

3. The method of claim 1 wherein, after coalescing pixels neighboring each selected pixel position, comparing the coalesced grayscale image information on a pixel by pixel basis with corresponding intensity threshold values in the lookup table to form a halftone image.

4. The method of claim 1 wherein coalescing pixels neighboring each selected pixel position is accomplished for pixels having intensity values that are high relative to the threshold value as well as pixels having intensity values that are low relative to the threshold value.

5. The method of claim 1 wherein identifying intensity threshold values further includes comparing a first coalescing threshold with lookup table values to determine selected pixel positions in the grayscale image for coalescing.

6. The method of claim 5 further including comparing a plurality of coalescing thresholds with lookup table values to determine selected pixel positions in the grayscale image for coalescing, each of the plurality of coalescing thresholds being associated with one of a plurality of parameters indicative of number and location of pixels for coalescing in the step of coalescing pixels neighboring each selected pixel position.

7. A method of forming halftone pixels to form a halftone image from grayscale pixels arranged to form a grayscale image comprising:

rearranging grayscale pixels in selected local neighborhoods comprising a plurality of grayscale pixels within the grayscale image based on an intensity value associated with a selected local neighborhood and intensity values of neighboring pixels within the selected local neighborhood; and converting grayscale pixels resulting from the rearranging grayscale pixels step to form halftone pixels forming a halftone image.

8. A printing device for receiving a grayscale image and providing a corresponding halftone image, the printing device comprising:

storage means for storing a lookup table having threshold values associated with each pixel within the grayscale image;

means for identifying intensity threshold values from the lookup table for each of a plurality of selected pixel positions in the grayscale image;

means for coalescing similar grayscale pixels in the grayscale image neighboring each selected pixel position based on the intensity threshold value associated with the selected pixel position and intensity information of neighboring pixels to form coalesced grayscale image information; and means for comparing coalesced grayscale image information on a pixel by pixel basis with corresponding intensity threshold values from the lookup table to form a halftone image.

9. A method for rendering a halftone image from a grayscale image including:

identifying grayscale pixels within the grayscale image for coalescing based on a comparison of a lookup table value corresponding to each grayscale pixel with a preselected range of values;

identifying a halftone pixel color for each grayscale pixel identified for coalescing based on a comparison of grayscale pixel intensity with a corresponding lookup table value; and coalescing grayscale pixels neighboring each grayscale pixel identified for coalescing that if coalesced has the same color as the corresponding grayscale pixel identified for coalescing.

10. The method of claim 9 wherein identifying grayscale pixels for coalescing is based on a comparison of a lookup table value corresponding to each grayscale pixel within one of a plurality of preselected ranges of values with each of the plurality of preselected ranges corresponding to a preselected number of pixels for coalescing.

11. The method for rendering a halftone image from a grayscale pixel of claim 9 wherein identifying a halftone pixel color for each grayscale pixel includes assigning a first pixel color for those grayscale pixel intensities greater than the corresponding lookup table value and assigning a second color for those grayscale pixel intensities that are less than the corresponding lookup table value.

12. The method for rendering a halftone image from a grayscale image of claim 10 wherein a plurality of preselected ranges includes a first range associated with a two-pixel dot and a second range associated with a four-pixel dot.

13. The method for rendering a halftone image from a grayscale image of claim 9 wherein the lookup table includes an equal number of each intensity value within the grayscale image with each of the intensity values being distributed throughout the lookup table.

14. The method for rendering a halftone image from a grayscale image of claim 9 wherein coalescing grayscale pixels includes:

identifying pixel locations to fill adjacent each grayscale pixel identified for coalescing;

comparing intensity values for grayscale pixels neighboring each grayscale pixel identified for coalescing with threshold matrix values associated with pixel locations to fill; and assigning grayscale pixel intensity values to the identified grayscale pixel locations to fill adjacent each of the grayscale pixels identified for coalescing.

* * * * *